No. 801,126. PATENTED OCT. 3, 1905.
O. M. ALEXANDER.
VALVE.
APPLICATION FILED FEB. 21, 1905.
2 SHEETS—SHEET 1.
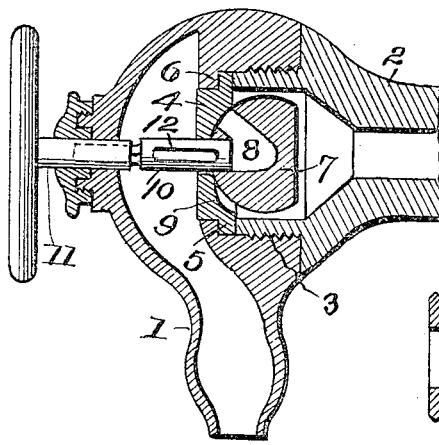
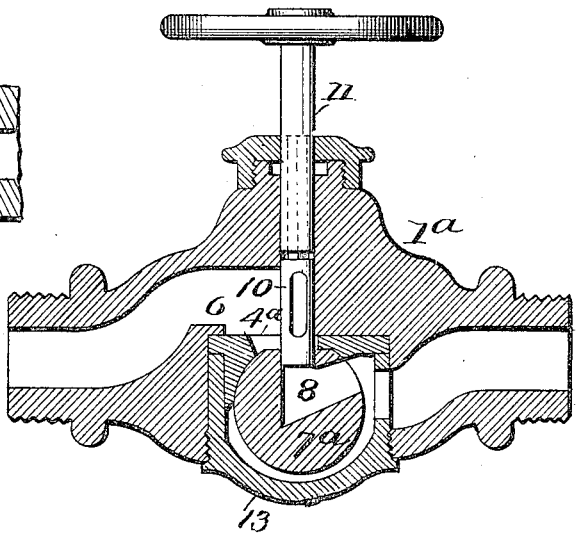
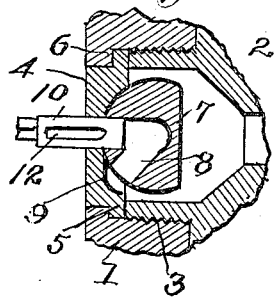
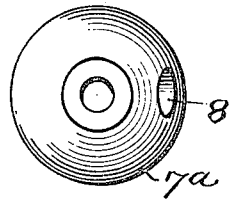
WITNESSES:
Jos. A. Ryan
Amos W. Hart
INVENTOR
Olin M. Alexander
BY Munn & Co.
ATTORNEYS No. 801,126. PATENTED OCT. 3, 1905.
O. M. ALEXANDER.
VALVE.
APPLICATION FILED FEB. 21, 1905.
2 SHEETS—SHEET 2.
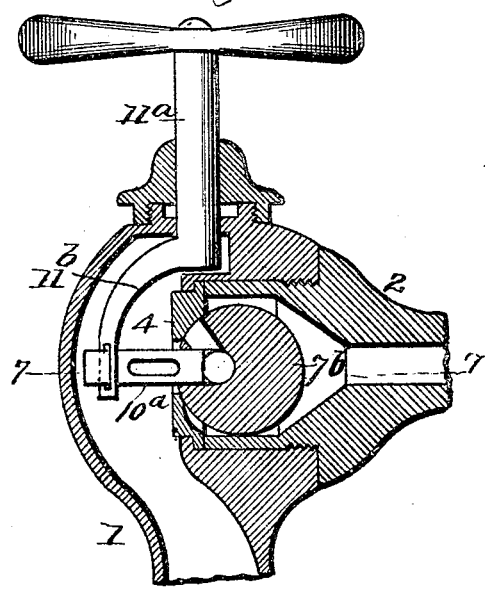
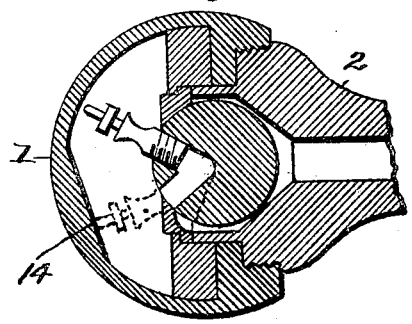
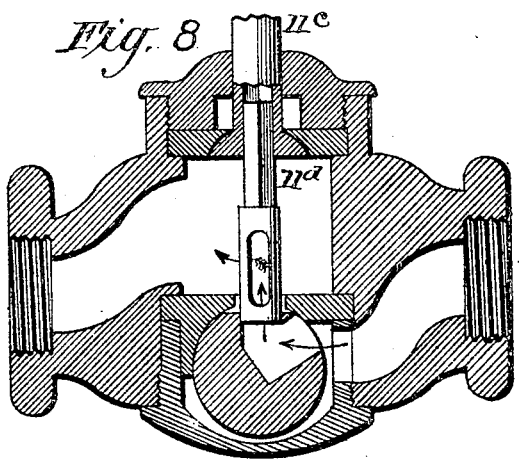
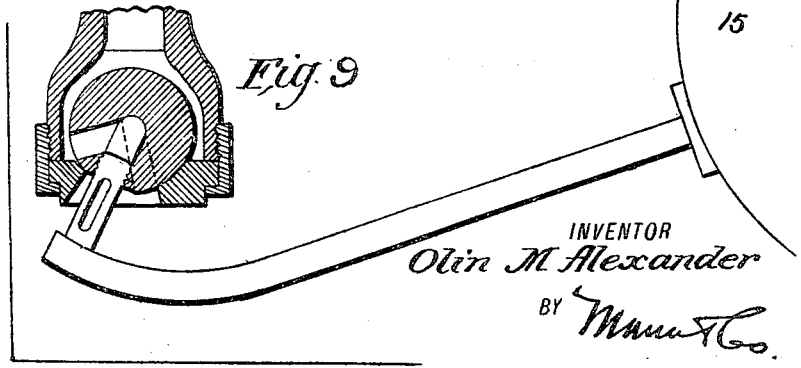
WITNESSES:
Jos. A. Ryan
Amos W. Hart
INVENTOR
Olin M. Alexander
BY Munn & Co.
ATTORNEYS

UNITED STATES PATENT OFFICE.

OLIN M. ALEXANDER, OF ANNISTON, ALABAMA.

VALVE.

No. 801,126.  Specification of Letters Patent.  Patented Oct. 3, 1905.

Application filed February 21, 1905. Serial No. 246,716.

*To all whom it may concern:*

Be it known that I, OLIN M. ALEXANDER, a citizen of the United States, residing at Anniston, in the county of Calhoun and State of Alabama, have made certain new and useful Improvements in Valves, of which the following is a specification.

The object of my invention is to provide an improved valve for use with liquid, steam, gas, or air vessels, pipes, or faucets, and it is more particularly an improvement upon the valve for which I have filed an application for patent, Serial No. 236,733. A distinguishing feature of both valves is the construction of the valve proper and its arrangement relative to its seat in such manner that the pressure of liquid or steam or other gas upon the inner side of the valve holds it to the seat, and the outflow-passage is on the outer side of the valve. The valve is preferably a sphere, or it may be a segment of a sphere, the spherical side abutting the corresponding seat, a characteristic feature in any case being the arrangement of the discharge or outflow passage so that the entrance and escape of liquid or gas are both on the same—to wit, the outer—side of the valve. A further characteristic is the construction of the arm, stem, or lever by which the valve is turned to allow or shut off discharge, it being preferably made hollow, so the liquid flows through it in discharging.

The invention further includes improvements in the valve-seat and the means for holding it to its place.

The details of construction, arrangement, combination, and operation of parts are as hereinafter described, reference being had to the accompanying drawings, in which—

Figure 1 is a longitudinal section of a faucet provided with my improvement. Fig. 2 is a detail view illustrating the reverse arrangement of the valve to permit discharge of liquid. Figs. 3, 4, and 4ª are different views of the spherical valve. Fig. 5 is a longitudinal section of a faucet embodying my invention in a modified form. Fig. 6 is a longitudinal section of the faucet illustrating another modification. Fig. 7 is a cross-section on the line 7 7 of Fig. 6. Fig. 8 is a section of another modification. Fig. 9 is another sectional view illustrating my invention applied in an automatic water-closet supply-valve.

Referring in the first instance to Figs. 1 and 2, the casing of the faucet therein illustrated is composed of an outer part 1 on the inner part 2, the former being provided with a screw-threaded socket and the latter with a cylindrical exteriorly-threaded extension 3, screwing into said socket and abutting the edge of the valve-seat 4. As illustrated in Figs. 3 and 4, the said seat is rabbeted, whereby it is provided with a circumferential flange or shoulder 5, and the portion 1 of the valve-casing or faucet is similarly constructed with an internal shoulder 6. Thus the shoulder or flange 5 of the valve-seat abuts the inner side of the shoulder 6 of the casing. The valve 7 is a segment of a sphere, or practically spherical, the outer side being seated in a corresponding hemispherical socket formed in the seat proper, 4. It will be noted that the valve is of less diameter than the internal diameter of the cylindrical threaded portion 3 of the valve-casing part 2, so that water or other liquid or steam or other gas may flow freely around the pipe. In place of constructing the valve with a discharge-passage 8, leading directly through it, as in my former invention, the passage is formed entirely on the outer or outflow side of the valve. It is thus made at an angle in the valve, as will be seen by reference to Fig. 4, and the valve-seat 4 is cut away at 9 on one side to form a passage which when the valve is adjusted, as shown in Fig. 2, forms practically a continuation of the passage 8 in the valve, through which water or gas may flow and discharge. For the purpose of manipulating—that is, rotating—the valve 7 I provide it with a hollow arm, stem, or lever 10 and apply thereto a handle or turn-key 11—that is to say, the hollow arm 10 is firmly secured to one portion or member of the valve-discharge passage 8 and is provided with lateral slots 12, through which liquid or gas may discharge into the casing, while the outer end of said arm is squared and enters a corresponding socket in the rotatable stem of the handle 11. The stem of the handle is suitably arranged in a stuffing-box, as shown. It will now be apparent that the pressure of the liquid or gas beyond the valve 7 tends to hold it firmly to its seat—the greater the pressure the greater the tightness of the valve—so that discharge of liquid or gas is entirely cut off; but by rotating the handle 11 the valve 7 may be rotated to bring the laterally-inclined portion of the passage 8 into coincidence with the cavity or passage 9, formed in the valve-seat, and thus permit water to flow in the direction of the arrows. The discharge is cut off by simply rotating the valve 7 back to the position indicated in Fig. 1, where the mouth of the laterally-inclined passage 8 is opposite that portion of the valve-seat which is concentric with the valve.

In Fig. 5 I show a modification in which the construction, arrangement, and operation are practically the same. The body $1^a$ of the valve-casing is provided, as before, with shoulders 6, against which the valve-seat $4^a$ rests; but instead of the valve-seat being held in place by a portion of the valve-casing forming a continuation of the water-passage it is held by a part or member 13, which is practically constructed as an exteriorly-threaded cylinder closed on the outer side, the inner edge abutting the valve-seat, as shown. The valve $7^a$ has an angular passage 8, the hollow arm 10, and handle 11, connected therewith. In the position shown in Fig. 5 liquid or gas has free passage through the valve and the casing; but by rotating it ninety degrees or even less the lateral mouth of the passage 8 in the valve will abut the concentric side of the valve-seat, and thus entirely cut off discharge, while, as in the first case, the pressure of the liquid or gas will be maintained on and around the entire inner side of the valve, thus holding it firmly to its seat.

Fig. $4^a$ shows a valve having its passage open laterally throughout its length.

In the modification shown in Fig. 6 the valve-casing is practically the same as that illustrated in Fig. 1, there being two parts 1 2, which are screwed together, the valve-seat being held in place and the valve $7^b$ seated thereon and adapted for rotation as before. The valve-stem $10^a$ is also hollow, as before, but instead of connecting with a handle 11; such as illustrated in Figs. 1 and 5, the stem or shank $11^a$ of the handle is provided with a crank or lateral arm $11^b$, the same being arranged within the chamber of the casing and provided at its outer extremity with a slot that receives the hollow arm or stem $10^a$ of the valve. It is apparent that by rotating on its axis the crank thus formed the valve-arm $10^a$ will be carried around horizontally in a greater or less arc, and the valve $7^b$ thereby shifted or turned on its seat, so as to uncover and cover the lateral mouth of its discharge-passage, as before explained, and thus cut off or allow discharge of liquid or gas as required. This operation will be further understood by reference to Fig. 7. The latter illustrates another feature of the invention—namely, means for insuring a freer and more rapid discharge of liquid when the valve is shifted to the proper position. As there shown, I provide the inner side of the casing-section 1 with a swell 14, which is located at such point that in rotating the valve 7 to the discharging position the outer end of its hollow arm $10^a$ strikes upon the swell 14, which thereby serves as a cam, and by the effect of the wedging action on the arm $10^a$ the valve $7^b$ is forced back from its seat, as illustrated by dotted lines Fig. 7, whereby water may flow freely around it and between it and the valve-seat.

In Fig. 8 I show the handle-stem $11^c$ of the valve provided with a hemispherical collar $11^d$, that seats upward and fits in a corresponding cavity in the plate forming the inner side of the stuffing-box. It is apparent that the pressure of steam, water, or other fluid in the chamber will serve to hold the collar to its seat with corresponding force, thus preventing leakage at that point.

In the modification shown in Fig. 9 I illustrate the application of a spherical valve, a hemispherical valve-seat, and a hollow arm in connection with the float 15 of a closet-tank, whereby the rise and fall of the float with the water in the tank operates the valve automatically, or, in other words, automatically adjusts the valve to permit discharge of water into the tank or cut off the same, as will be readily understood.

It will be seen that by my improved construction and arrangement of parts the valve is kept closed by the pressure of liquid, steam, or other gas on its inner side, so that no washers or packing are required, and the greater the liquid or gas pressure beyond the valve the greater its pressure on the seat, so that it effectively cuts off any discharge. In cases where the valve and seat are employed in connection with vessels or pipes where the heat is sufficient to cause a considerable expansion, as in the case of hot-water or steam cocks, the efficiency of the valve is not in the least impaired, since the expansion applies equally to both the valve and its seat. It will be further seen that the more the valve wears into the seat the more tightly it will fit, so as to more effectually cut off any discharge of liquid or gas. It will be further seen that the valve will thus remain effective until it or the seat is completely worn out, and then the parts may be readily replaced by simply separating the parts of the casing that inclose them and by which they are held in place. In other words, while I provide a valve in which no packing, washers, or bibs are required provision is made for convenient repair and substitution of parts. The valve is particularly efficient in soda-fonts, faucets, steam, gas, and air pipes, and, in fact, wherever the valve is subject to more or less pressure.

I desire it understood that I do not confine my invention to the details of construction and arrangement shown and described, but intend to adopt any changes that may lie within the scope of the practice of my invention as before outlined.

What I claim is—

1. The combination, with the casing having a hemispherical seat, of a hemispherical valve applied to such seat and adapted to rock therein, and having a discharge-passage arranged on the outflow side, the seat being cut away at one point to form a cavity or passage which when the valve is properly adjusted coincides with the lateral mouth of the passage in the valve and is closed by the solid portion of the valve when the latter is rotated to the opposite position, and means for operating said valve, substantially as described.

2. The combination with a valve-casing having on its inner side a swell adapted to serve as a cam as described, of a valve-seat and valve arranged in said casing, the valve having a discharge-passage and an arm projecting into the chamber of the casing and adapted when the valve is rotated to the discharge position to ride upon the cam and thus force the valve off its seat, and means for operating the valve, substantially as described.

OLIN M. ALEXANDER.

Witnesses:
SOLON C. KEMON,
AMOS W. HART.